United States Patent [19]
Kato et al.

[11] Patent Number: 5,436,058
[45] Date of Patent: Jul. 25, 1995

[54] LAMINATED STEEL SHEET FOR CANS

[75] Inventors: Hiroyuki Kato; Hirohide Furuya; Takaaki Kondo; Naoyuki Ooniwa, all of Kawasaki, Japan

[73] Assignee: NKK Corporation, Tokyo, Japan

[21] Appl. No.: 127,774

[22] Filed: Sep. 27, 1993

[30] Foreign Application Priority Data

Feb. 26, 1993 [JP] Japan .................. 5-038361

[51] Int. Cl.⁶ .............. B32B 15/08; B65D 8/04; B65D 8/18
[52] U.S. Cl. ........................... 428/194; 428/216; 428/35.8; 428/414; 428/416; 428/340; 428/480; 220/415; 220/906
[58] Field of Search ........... 428/414, 194, 416, 910, 428/340, 480, 216, 35.8

[56] References Cited

U.S. PATENT DOCUMENTS 5,137,762  8/1992  Aizawa et al. .................. 428/35.8

FOREIGN PATENT DOCUMENTS

| 0312308 | 4/1989 | European Pat. Off. . |
| 0493119 | 7/1992 | European Pat. Off. . |
| 0512606 | 1/1993 | European Pat. Off. . |
| 0562611 | 9/1993 | European Pat. Off. . |
| 4029553 | 3/1991 | Germany . |
| 3-236954 | 10/1991 | Japan . |

OTHER PUBLICATIONS

Derwent Publications Ltd., London, GB; AN 86-314835 (48) of JP-A-61 232 148 (Kokkai Seikan KK), Oct. 16, 1986.
Patent Abstracts of Japan, vol. 14, No. 390 (C-0751) 23 Aug. 1990 of JP-A-02 145 774 (Sumitomo Metal Ind Ltd), Jun. 5, 1990.

*Primary Examiner*—P. C. Sluby
*Attorney, Agent, or Firm*—Frishauf, Holtz, Goodman & Woodward

[57] ABSTRACT

A laminated steel sheet for cans comprises: a steel sheet; a metallic chromium plated layer with a 5 to 150 mg/m² coating weight formed on the sheet; a hydrated chromium oxide layer with a 3 to 15 mg/m² coating weight in terms of chromium formed on the metallic chromium layer; a bonding layer formed on the hydrated chromium oxide layer; and a biaxially oriented polyethylene terephthalate resin film formed on the bonding layer with a strip-shaped margin left for welding, the bonding layer being obtained by curing an adhesive having bisphenol A epoxy resin which has 15,000 to 30,000 number average molecular weight and is from 70 to 90 wt. % of said bonding layer with the remainder being resol phenol resin which has a base of bisphenol A. Other related laminated sheets are also provided.

24 Claims, 3 Drawing Sheets

LAMINATED STEEL SHEET FOR CANS

BACKGROUND OF THE INVENTION

1. Field of the Invention

The present invention relates to a laminated steel sheet used for welded cans such as food cans and, more particularly, a laminated steel sheet for cans which is easily welded and has a film structure for preventing a decrease in adhesion a of laminated resin film in the can making and filling processes.

2. Description of Related Art

There are several methods of manufacturing cans: the soldered can making method, welded can making method, cementing can making method, draw and ironing can making method, draw and redraw can making method, etc. The welded can making method uses simpler equipment than any other methods and can be carried out by easy and reliable operation. The cans made by this method have welded portions with high strength, and withstand severe working. For these reasons, the welded can making method has come into wide use rapidly.

In the soldered can making or welded can making methods, to make a round can, for example, opposed ends of a sheet cut into a square necessary for the can body are joined, and the joint is welded by soldering or electric resistance welding. For plating of steel sheet for cans for the soldering or welding can making methods, tin was initially used.. In the welded can making method, however, far less deposit of tin is required than the soldering can making method, or the deposit of tin is not required at all, so that thin plating or combined use of other metal is carried out. From this point of view, the rationalization of the welded can making method is anticipated.

The body and ends of food cans are painted. The painting includes thick-film painting for enhancing corrosion resistance of the inner surface of the can, painting for protecting the outer surface, printing, and the like. When painting or printing is performed, a plated steel sheet is cut into a predetermined size, and then each piece of sheet is painted, dried, or printed. This process requires a high transportation cost as well as measures against environmental pollution due to painting. Therefore, these disadvantages have been some of the problems to be solved in can making.

As the first stage for solving the above problem, what is called the precoating, in which a plated steel sheet is painted in advance or a resin film is laminated, was tried. However, the merely precoated steel sheet had a problem in that the resin film in the welded area must be removed in welding.

So far, a steel strip on which a film is laminated in a band form except for a welded area has been proposed for welded cans. For instance, Japanese Patent Laid-Open H-3-236954 discloses a material for cans on which a thermal plasticity film is laminated over a width corresponding to the height of a can except for a non-laminated area 2 to 5 mm wide. The disclosed resins for thermal plasticity film are polyester, polypropylene, polyethylene, and nylon.

In the steel sheet for cans proposed above, the decrease in adhesion strength between coating film and base due to the thermal effect in welding, touch-up painting of welded area, or heating is not considered. As a result, there is a problem of insufficient adhesion after retorting, i.e., heating.

The present invention was made to solve this problem. It provides a laminated steel sheet for welded cans which ensures high adhesion strength even if heat is applied and has high adhesion after retorting by forming a film structure for overcoming the causes for decreasing adhesion strength in the can making process.

SUMMARY OF THE INVENTION

An object of the present invention is to provide a laminated steel sheet for cans which can be easily welded and has a film structure for preventing the decrease in adhesion strength of laminated resin film during the can making and filling processes.

To achieve the above object, the present invention firstly provides a laminated steel sheet for cans comprising:

a steel sheet;

a metallic chromium plated layer formed on said steel sheet, said metallic chromium plated layer having a 5 to 150 mg/m$^2$ coating weight;

a hydrated chromium oxide layer formed on said metallic chromium plated layer, the hydrated chromium oxide layer having a 3 to 15 mg/m$^2$ coating weight as a principal component in terms of conversion into chromium;

a bonding layer formed on said oxide coated metallic chromium plated layer, said bonding layer being obtained by curing an adhesive having bisphenol A epoxy resin of 15,000 to 30,000 number average molecular weight which ranges 70 wt. % to 90 wt. % of said bonding layer and having, as the remainder, a resol phenol resin which has a base of bisphenol A; and a biaxially oriented polyethylene terephthalate resin film bonded on said bonding layer with a strip-shaped margin left for welding.

The present invention secondly provides a laminated steel sheet for cans comprising:

a steel sheet;

a metallic chromium plated layer formed on said steel sheet, the metallic chromium plated layer having a 50 to 150 mg/m$^2$ coating weight;

a tin layer formed on said metallic chromium plated layer, said tin layer having a 50 to 500 mg/m$^2$ coating weight;

a chromate layer formed on said tin layer;

a bonding layer formed on said chromate layer, said bonding layer being obtained by curing an adhesive having bisphenol A epoxy resin of 15,000 to 30,000 number average molecular weight which ranges 70 wt. % to 90 wt. % of said bonding layer and having, as the remainder, a resol phenol resin which has a base of bisphenol A; and a biaxially oriented polyethylene terephthalate resin film bonded on said bonding layer with a strip-shaped margin left for welding.

The present invention thirdly provides a laminated steel sheet for cans comprising:

a steel sheet;

a metallic chromium plated layer formed on said steel sheet;

a hydrated chromium oxide layer formed on said metallic chromium plated layer, said hydrated chromium oxide layer having a 3 to 15 mg/m$^2$ coating weight as a principal component in terms of conversion into chromium, and having a 5 to 150 surface roughness PPI (threshold: 0.5 μm); and a biaxially oriented film thermo-compressed on said hydrated chromium oxide layer with a strip-shaped margin left for welding, the biaxially oriented film having polyethylene terephthalate and 0.5 to 10 mol % isophthalic acid of an acid component, and said acid component comprising terephthalic acid and the isophthalic acid.

The present invention fourthly provides a laminated steel sheet for cans comprising:

a steel sheet;

a metallic chromium plated layer formed on said steel sheet;

a tin layer formed on said metallic chromium plated layer;

a chromate layer formed on said tin layer;

a biaxially oriented film thermo-compressed on said chromate treatment layer with a strip-shaped margin left for welding, said biaxially oriented film having polyethylene terephthalate and 0.5 to 10 mol % isophthalic acid of an acid component, and said acid component comprising terephthalic acid and the isophthalic acid.

The present invention fifthly provides a laminated steel sheet for cans comprising:

a steel sheet;

a metallic chromium plated layer formed on said steel sheet;

a hydrated chromium oxide layer formed on said metallic chromium plated layer; and a two-layer resin film thermo-compressed on said hydrated chromium oxide layer with a strip-shaped margin left for welding, a lower layer of the two-layer resin film having polyethylene terephthalate and 0.5 to 10 mol % isophthalic acid of an acid component, an upper layer of said two-layer resin film having a biaxially oriented polyethylene terephthalate resin, and the acid component comprising terephthalic acid and the isophthalic acid.

The present invention still further provides a laminated steel sheet for cans comprising:

a steel sheet;

a metallic chromium plated layer formed on said steel sheet;

a tin layer formed on said metallic chromium plated layer;

a chromate layer formed on said tin layer; and a two-layer resin film thermo-compressed on said chromate layer with a strip-shaped margin left for welding.

DESCRIPTION OF THE PREFERRED EMBODIMENT

Figure 1:
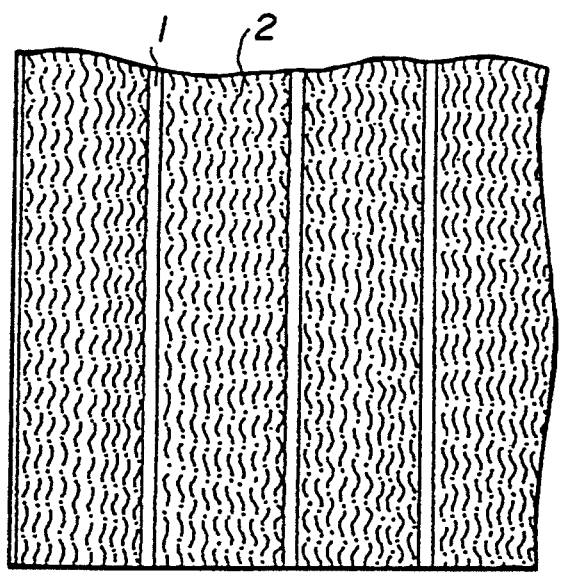
FIG. 1 is a plan view showing the surface of a laminated steel sheet for cans in accordance with the present invention.
Figure 2:
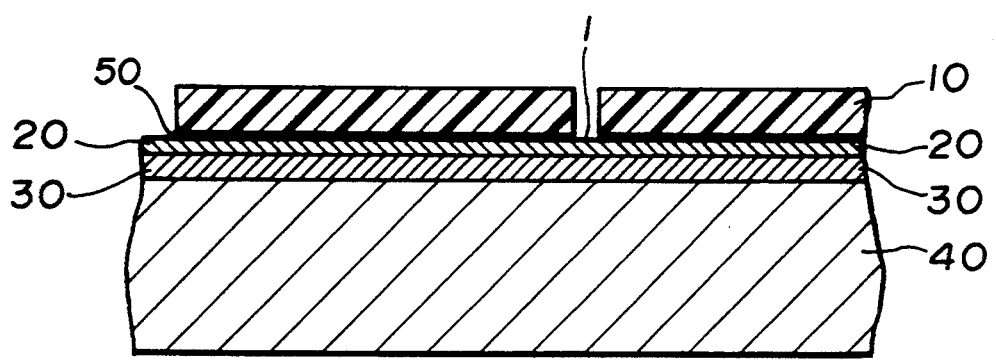
FIG. 2 is a sectional view of a laminated steel sheet having one plated layer and one resin film layer of the present invention.

The surface of a laminated steel sheet has an area where resin film is laminated and a non-resin-coated area where resin film is not laminated. In the non-resin-coated area, chemical treatment is made to provide better adhesion of paint to a tin layer. FIG. 1 is a plan view showing the surface of the laminated steel sheet. The non-resin-coated area 1 and the resin-coated area 2 are arranged alternately. FIG. 2 is a sectional view of a laminated steel sheet of one embodiment. In this figure, reference numeral 10 denotes a resin film, 20 a chromate treatment layer, 30 a chromium layer, 40 a steel sheet, and 50 an adhesive layer.

Figure 3:
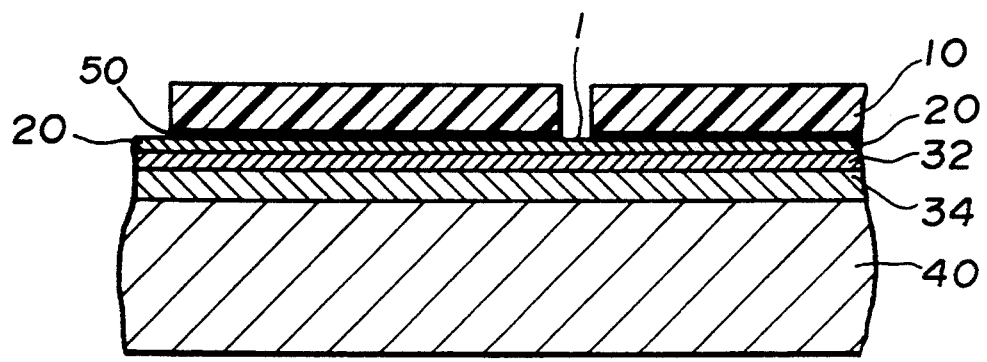
FIG. 3 is a sectional view of a laminated steel sheet having two plated layers and one resin film layer of the present invention.
Figure 4:
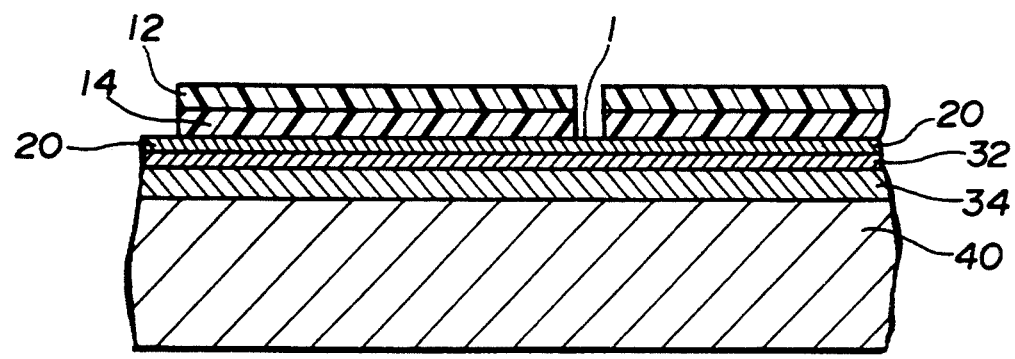
FIG. 4 is a sectional view of a laminated steel sheet having two plated layers and two resin film layers of the present invention.

The non-resin-coated area 1 has a plated layer 30 formed on a steel sheet 40 and a chromate layer 20. Thus, in this area there is no laminate resin film. The chromium layer 30 and chromate treatment layer 20 are applied to the non-resin-coated area to provide high adhesion of painting. FIG. 3 is a sectional view of a laminated steel sheet of a second embodiment. The steel sheet 40 supports a metallic chromium plated layer 34 and a tin layer 32 formed on the layer 34 and a chromate layer 20 on the tin layer 32. An adhesive layer 50 is placed on the chromate layer. FIG. 4 is a sectional view of a laminated steel sheet of a third embodiment. In this embodiment, the steel sheet 40 supports a lower metallic chromium plated layer 34 and an upper tin layer 32, followed by a chromate layer 20 and two resin layers are formed on the chromate layer. The lower resin layer 14 contains polyethylene terephthalate as a principal component and an acid component including isophthalic acid in an amount from 0.5 to 10 mol % of the acid component, and an upper resin layer 12 is formed of biaxially oriented polyethylene terephthalate resin. Therefore, by using the non-resin-coated area as a margin to weld, there is no need for removing resin film in welding for can making even if resin film is laminated on the steel sheet in advance. In addition, the adhesion of touch-up paint in the weld zone is ensured.

In the resin laminated area, resin is laminated on the plated layer. Therefore, troublesome painting need not be performed in can making. The width of the resin laminated area is determined depending on the diameter of the can. For instance, the width is 161 mm for a 200 ml drink can. The resin laminated area may be disposed at least on one face constituting the inner surface of can. The resin laminated area may be disposed on both faces. In this case, treatment is carried out considering the inner and outer surfaces of the can. For instance, the face corresponding to the inner surface of the can is provided with the resin laminated area in accordance with the present invention, while the face corresponding to the outer surface of the can is provided with a plated layer only, a white coat (a paint using white pigment which has a high opacifying power) as the printing base, or a print laminate layer. That is to say, the outer face is treated depending on the requirement. In this case, the non-resin coated areas are, needless to say, disposed at the appropriate positions on the outer and inner surfaces.

When welding is performed, the width of the non-resin-coated area is important. The temperature of weld zone exceeds 1000° C. and the heat of welding propagates in the circumferential direction of can body. The property of the resin layer must not be impaired by the effect of this heat. If the width of the non-resin-coated area is too narrow, the resin may be melted or deteriorated, resulting in a reduction in corrosion resistance or adhesion to the plated steel sheet. The width of the non-resin-coated area required for avoiding the effect of welding heat differs depending on the welding method and the heat resistance of laminated resin. For the electric resistance welding widely used at present, the width should be 5 mm or more. If a high-speed welding method using high density energy is employed, this width can be decreased. However, a width of 0.5 mm or more is needed because the thickness of steel sheet for cans is about 0.2 mm.

The resin film must withstand the working and heating in the can making process, and must be corrosion resistant in combination with the plated layer. Polyester base resins are known as a well balanced resin having both high workability and corrosion resistance. Among them, polyethylene terephthalate is also heat resistant. In particular, its biaxially oriented film has a high property for shutting off corrosive substances in the can (i.e., preventing corrosive substances in the can from attacking the plated steel) because it is highly crystallized. In addition, it does not shrink even if it is heated in can making or with the contents in the can, thus the initial adhesion being maintained. If the shrinkage is high, the adhesion decreases. A shrinkage rate of 0.1% or less shrinkage rate poses no problem, but higher shrinkage decreases the adhesion in working or retorting. With other resins such as nylon or polypropylene, the shutoff property can be obtained, but its shrinkage is high, so that it is difficult to avoid the above-described decrease in adhesion.

It has been found, however, that when the biaxially oriented film of polyethylene terephthalate resin is laminated by the thermo-compression method, the adhesion to the surface of plated steel sheet is not necessarily sufficient. The reason for this is that the biaxially oriented PET film does not have sufficient flowability in thermo-compression, so that it sometimes cannot follow the irregularities of the plated surface. At the portion where the resin cannot follow, air or moisture remains, which causes separation of resin film due to heating after can making.

This disadvantage of biaxially oriented PET film can be compensated by using an adhesive having high flowability or by improving the flowability of the terephthalate resin. However, this adhesive must have sufficient adhesion property, be able to withstand working like the resin film, and have heat resistance. In addition, it must be sufficiently cured in a short time when film laminated steel sheets are manufactured continuously. If a can is manufactured with the adhesive being cured insufficiently, the adhesion of resin film is decreased or the resin film is clouded white by the reaction of uncured resin, which is called "whitening", in retorting.

Epoxy resins are often used as an adhesive. Among them, bisphenol A epoxy resin is chemically stable and has high heat resistance. However, this resin takes too much time for curing and becomes too hard to maintain the workability depending on the molecular weight of adhesive resin. The inventors studied in detail the relationship between these phenomena and the resin, and found that there is a resin which overcomes the drawbacks in epoxy resin and that the epoxy resin has the optimum range of molecular weight.

To finish curing in a short time, an appropriate amount of resol type phenol resin whose base is bisphenol A is mixed. This resin is selected in consideration of a property that its addition accelerates the curing of adhesive, and enhances heat resistance and workability. Hereinafter, the property that an adhesive cures in a short time is called a short curing time property. It is thought that the resol type phenol resin reacts with an unreacted functional group in heating for bonding and crosslinks the epoxy, thereby the curing time being shortened.

Figure 5:
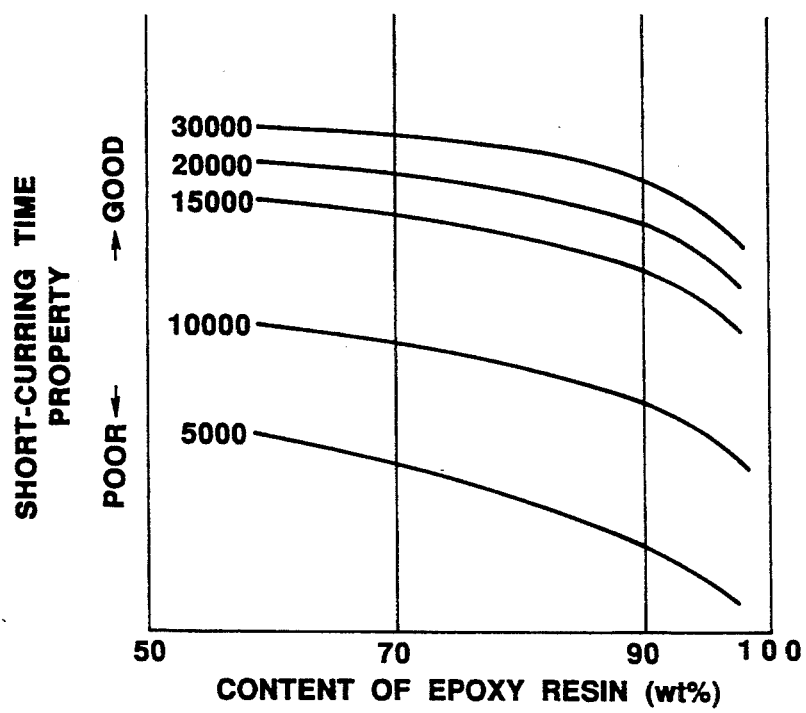
FIG. 5 is a graph showing the relationship between epoxy resin content (wt %) in adhesive and short curing time property with the molecular weight of epoxy resin being used as a parameter.

The short curing time property relates also to the molecular weight of the epoxy resin itself; a resin having a higher molecular weight cures in a shorter time. This relationship is shown in FIG. 5. In this figure, the ordinate represents the short curing time property and the abscissa the content of epoxy resin in the adhesive, the balance being the aforesaid resol type phenol resin. As the number average molecular weight of the epoxy resin increases from 5000 to 30,000, the short curing time property becomes higher. This effect is particularly obvious when the number average molecular weight of the epoxy resin is over 15,000. At the same time, as the content of the epoxy resin increases, the short curing time property decreases. In particular, if the content exceeds 90 wt %, the decrease in short curing time property becomes remarkable. If the short curing time property decreases and the epoxy resin remains uncured, sufficient adhesion is not provided, retorting causing whitening.

However, the adhesion property of the adhesive depends mainly on the content of the epoxy resin. If the content of epoxy resin is less than 70 wt %, the required adhesion is sometimes not obtained in working. Also, the molecular weight of the epoxy resin has an upper limit. If the molecular weight is too high, the adhesive film becomes hard after being heated for curing. If the number average molecular weight exceeds 30,000, there is a possibility of cracks occurring during working.

If an improper adhesive decreases the adhesion property, organic substances are eluted into the can, sometimes causing the contents to have an odor.

Summarizing the adhesive, the adhesive includes bisphenol A epoxy resin containing a resol type phenol resin whose base is bisphenol A. The content of bisphenol A epoxy resin should be 70% to 90% and its number average molecular weight should be 15,000 to 30,000. The use of such an adhesive provides strong adhesion to the surface of plated steel sheet by short-time heating even when the resin film is polyethylene terephthalate, and prevents defects such as cracking, separation or whitening of film in working or retorting, and elution of organic substances in the can making process. To obtain Bisphenol A epoxy resin, a condensation product of epichlorohydrin-bisphenol A is used. The number average molecular weight of the epoxy resin preferably ranges from 15,000 to 28,000, and more preferably from 16,000 to 25,000. The ratio of the bisphenol A epoxy resin ranges preferably from 70 to 90 wt. % of the bonding layer, and more preferably from 75 to 85 wt. %.

An appropriate amount of adhesive applied differs depending on the surface roughness of plated steel sheet. An amount of adhesive for correcting the irregularities of surface is required to prevent air and moisture from being trapped between the plated steel sheet and the resin film. If the surface roughness is large, the necessary amount of adhesive becomes larger. The present plated steel sheet has a surface roughness PPI (threshold: 0.5 $\mu$m) of about 20 to 200. For such a plated steel sheet, a proper amount of adhesive is about 2 to 50 mg/dm$^2$. The surface roughness PPI is the number of peaks (per inch) exceeding the threshold appearing in the cross section of the surface.

Another measure to overcome the drawbacks in the biaxially oriented PET film is to improve its flowability. This is achieved by replacing a part of terephthalic acid, the acid component of terephthalate, with isophthalic acid. This replacement decreases the degree of crystallization of the resin, thereby lowering the melting point of the film in forming the film, and enhances the flowability in thermo-compression. The effect is larger as the content of isophthalic acid increases.

Unless the amount of isophthalic acid reaches 0.5 mol % of the acid component, the effect of the improvement in flowability is not significant. Contrarily, if the content of isophthalic acid is too high, the resin film shrinks in heating in the can making process, whereupon stresses are accumulated in the resin film, so that the adhesion is easily deteriorated in working. For this reason, a content exceeding 10 mol % of acid component should be avoided. Instead, the surface roughness of plated steel sheet should be reduced for the resin to easily follow the irregularities.

Thus, the entrance of air or moisture can be prevented and sufficient adhesion strength can be obtained by thermo-compressing a biaxially oriented film whose principal component is polyethylene terephthalate having 0.5 to 10 mol % of the acid component being isophthalic acid on a plated steel sheet with a 150 or less surface roughness PPI (threshold: 0.5 $\mu$m). The lower the PPI, the less air or moisture is entrapped. A lower surface roughness is preferable from the viewpoint of adhesion. However, if the PPI (threshold: 0.5 $\mu$m) is as low as 5 or less, scratches are liable to develop in handling for printing.

To decrease the roughness of plated surface, it is effective to decrease the roughness of base steel sheet. In order to obtain a surface of plated steel sheet with a 150 or less surface roughness PPI (threshold: 0.5 $\mu$m), a steel sheet with a 180 or less surface roughness PPI (threshold: 0.5 $\mu$m) should be used.

When a copolymer resin film in which a part of terephthalic acid is limitedly replaced with isophthalic acid is laminated on a plated steel sheet with limited surface roughness, a laminate layer can be obtained which has a high adhesion property while maintaining the excellent property of polyethylene terephthalate.

By using this technique, a two-layer film having a biaxially oriented polyethylene terephthalic acid resin layer and a polyethylene terephthalic acid copolymer layer in which 0.5 to 10 mol % terephthalic acid is replaced with isophthalic acid is fixed to a plated surface by heating with the latter layer being in contact with the plated surface. Thus, a laminate layer which has a high adhesion property while maintaining the excellent property of polyethylene terephthalate can be obtained.

The thickness of the resin film is preferably 5 $\mu$m to 60 $\mu$m, although it is not limited to this range. For the two-layer film, the total thickness should be in the above range, and the copolymer layer containing isophthalic acid is preferably 1 $\mu$m or more.

A chromium plated layer itself has corrosion resistance and good adhesion to the resin layer. In addition, the chromium plated layer offers high corrosion resistance in combination with the above-described resin layer. In the chromium plated steel sheet, the chromium plated layer is so constructed that the hydrated chromium oxide increases upward from the metallic chromium layer at the bottom, and a layer of hydrated chromium oxide is formed at the uppermost portion. It is thought that hydrated chromium oxide provides high adhesion strength because it has a polarity and a bonding force such as hydrogen bonding or Van der Waals force acts between the hydrated chromium oxide and the organic resin layer.

The chromium plated layer is obtained by cathode electrolysis in a water solution containing chromate or bichromate as an ion source and sulfuric acid ion, fluoride ion, silicofluoride ion, etc. as an auxiliary. The amount ratio of metallic chromium and hydrate chromium oxide can be controlled with the conditions of plating.

The chromium plating is performed as follows:
The components and the temperatures of the plating liquids are set as shown below.

| First Plating Liquid | | Second Plating Liquid | |
|---|---|---|---|
| $CrO_3$ | 175 g/l | $CrO_3$ | 50 g/l |
| $Na_2SiF_6$ | 5 g/l | $NH_4F$ | 2 g/l |
| $Na_2SiO_4$ | 0.9 g/l | | |
| Temperature: | 45° C. | Temperature: | 40° C. |

The coating weight of metallic chromium is controlled as illustrated by the three methods given below.

The first method is one which intermittently electrolyzes the first plating liquid, with the steel sheet as a cathode. The coating weight is controlled by the time of the electric current's flow.

The second method is one which electrolyzes the first plating liquid, with the steel sheet as an anode during the performance of said first method.

The third method is a continuous cathode treatment wherein the steel sheet is passed through the first plating liquid and the second plating liquid continuously. The coating weight of metallic chromium is controlled by the time of the electric current's flow.

Among the three methods, the second method is preferred. The second method is performed as follows: in the first plating liquid, the electric density is 25 A/dm$^2$, the time of electric current flow is 0.3 seconds and the time without electric current flow is 0.3 seconds. Thus, the intermittent electrolysis is carried out with a total electric current flow time of 0.9 to 1.5 seconds. And then, the anode treatment of 1 A/dm$^2$×0.3 seconds is carried out.

To ensure high adhesion strength between the plated layer and the resin layer, more than a certain amount of metallic chromium and hydrated chromium oxide is required. For the metallic chromium, the coating weight of at least 5 mg/m$^2$ is required, while for the hydrated chromium oxide, the coating weight of at least 3 mg/m$^2$ as converted into chromium is required.

However, chromium is a hard metal, so that too high a coating weight reduces the area of contact with the electrode, thereby the weldability being impaired. Therefore, the upper limit of coating weight is set to 150 mg/m$^2$ to obtain a plated layer having high adhesion to resin layer and weldability. The chromium oxide layer is an electrical insulator, so that some consideration is needed to ensure weldability. This insulating layer must be destroyed in the welding to let welding current flow, and it is preferable that the welding current flows uniformly. If the current flows locally, an excess current area is produced, and a phenomenon which is called splash, in which melted material scatters, occurs.

The occurrence of splash not only contaminates the area around the weld but also sometimes damages the area, so that the welding operation becomes impossible. To prevent this phenomenon, the layer thickness of chromium oxide is decreased. If the coating weight of hydrated chromium oxide exceeds 15 mg/m$^2$, the application range of welding current in which splash does not occur becomes too narrow, which provides poor practicality. Therefore, the upper limit of coating weight is set to 15 mg/m$^2$ to obtain a plated layer having high adhesion of resin layer and weldability.

The chromium plated layer is classified into flat plate type, protrusion type, mixed type, etc. depending on the film surface shape. Recently, an attempt has been made to form particle- or horn-shaped protrusions on the surface to improve the weldability so as to destroy hydrated chromium oxide at the tip of the protrusion in welding. With the flat plate type and the protrusion type having a high protrusion density, the welding current flows uniformly, whereas with the mixed type, the protrusion density is low and the uniformity of welding current is impaired, so that it is preferable to decrease the coating weight.

When the metallic chromium layer, and the chromium hydrated oxide layer are formed on the steel sheet, the coating weight of metallic chromium ranges preferably from 5 to 150 mg/m$^2$. The range of from 10 to 135 mg/m$^2$ is more preferable and the range of from 25 to 135 mg/m$^2$ is much more preferable.

If a tin layer is disposed on the chromium plated layer, a large area of contact can be easily obtained in welding and the weldability is improved because tin is a soft metal and has a low melting point. This effect appears remarkably when the coating weight of tin becomes 50 mg/m$^2$. However, if the coating weight is increased over 500 mg/m$^2$, further improvement is hardly anticipated. Therefore, the preferable coating weight of tin is 50 to 500 mg/m$^2$. Tin is easily alloyed with iron and this produced alloy is so hard to impair the weldability of tin. Therefore, a plated layer of chromium which is difficult to be alloyed with tin is disposed under the tin layer. In this case, a chromium plated layer of 50 mg/m$^2$ or more can prevent alloying of tin with iron. When the metallic chromium layer, the tin layer and the chromate layer are formed on the steel sheet, the coating weight of metallic chromium ranges preferably from 50 to 150 mg/m$^2$. The range of from 60 to 140 mg/m$^2$ is more preferable and the range of from 70 to 135 mg/m$^2$ is much more preferable.

When a tin layer is used, chromate treatment must be applied on the tin layer to ensure adhesion of organic resin. For the chromate treatment layer, a coating weight of 3 mg/m$^2$ in terms of conversion into chromium ensures a sufficiently high adhesion property. A coating weight exceeding 30 mg/m$^2$ is unnecessary, rather having a possibility of decreasing the proper range of welding current. When the metallic chromium layer, and the hydrated oxide layer are formed on the steel sheet, the coating weight of hydrated chromium oxide calculated as chromium ranges preferably from 3 to 15 mg/m$^2$. The range of from 5 to 13 mg/m$^2$ is more preferable and the range of from 7 to 12 mg/m$^2$ is much more preferable. Further, when the metallic chromium layer, the tin layer and the chromate layer are formed on the steel sheet, the coating weight of the chromate layer ranges preferably from 3 to 30 mg/m$^2$. The range of from 7 to 26 mg/m$^2$ is more preferable and the range of from 12 to 23 mg/m$^2$ is much more preferable.

EXAMPLE

Plated steel sheet were produced as follows: A cold-rolled sheet 0.20 thick and 842 mm wide was decontaminated by degreasing and pickling, and then chromium plated in the first and second embodiments or was subjected to tinning and chromate treatment following chromium plating in the third and fourth embodiments. These plated steel sheets were coated with resin film using an adhesive in the first and third embodiments or by roll compression in the second and fourth embodiments except for the non-resin-coated areas to obtain laminated steel sheets. The resin film used in Examples 1 and 3 has polyethylene terephthalate which does not include isophtalic acid. The polyethylene terephthalate is one comprising 50% ethylene glycol and 50% terephtalic acid, used in general. The resin film used in Examples 2 and 4 has polyethylene terephthalate which includes isophthalic acid as an acid component. The isophthalic acid ranges preferably from 0.5 to 10 mol % in the acid component. The (i) range of from 2 to 8 mol % and (ii) 7 mol % are more preferable and the range of from 4 to 6 mol % is much more preferable. On the laminated steel sheets, weldability, adhesion in working, shrink characteristics of film, and adhesion after retorting were investigated. For the laminated steel sheets using adhesive, resistance to whitening and amount of eluted organic substances were also investigated.

For the coating using adhesive, an adhesive was applied to a polyethylene terephthalate resin film, which was then laminated on the plated steel sheet.

The roll compression was performed as follows: A plated steel sheet was preheated at 180°-230° C. with an induction heater. A biaxially oriented resin film of polyethylene terephthalate containing isophthalic acid was bonded continuously while being compressed by a roll on the preheated plated steel sheet, and postheating was performed at 200°-230° C. and then the laminated steel sheet was cooled.

In addition to these resin films, an investigation was made for comparison on nylon and polypropylene.

The test and evaluation were performed for each property as follows:

Weldability: A body of 200 ml can was welded continuously using an electric resistance welding machine to determine the proper welding current range which provides sufficient weld strength without the occurrence of splash.

In the test results, the current range over 700 A was marked with Ⓞ, 400–700 A with o, 100–400 A with A, and under 100 A with X. Incidentally, the proper welding current range over 400 A in this test does not pose any problem for practical use.

Adhesion in working: After welding, a test piece was cut from the area near the weld. Grids were engraved at every 2 mm interval on the film surface of the test piece. After the test piece was extruded to Erichsen value of 4 mm, the laminate film was forcedly separated with an adhesive tape to determine the percentage of separated area. In the test results, a separated area less than 10% was marked with o, a separated area 10% to 30% with Δ, and a separated area 30% or more was marked with X.

Shrink characteristics of film: Immediately after laminating, a steel sheet was subjected to blanking, heated at 210° C. for 30 seconds, and cooled rapidly. The shrinkage percentage was determined from the difference of resin film width before and after heating.

Adhesion after retorting: After welding, a test piece was cut from the area near the weld. A cross cut was engraved on the film surface of the test piece. After the test piece was extruded to Erichsen value of 5 mm, the test piece was immersed in a water solution containing 1.5% NaCl at 125° C. for 30 minutes. Then, the laminate film was forcedly separated with an adhesive tape to evaluate the separation state. In the test result, no separation was marked with o, slight separation around the cross cut with Δ, and separation on the almost entire surface with X.

Resistance to whitening: The degree of whitening was observed after the aforesaid retorting was performed. In the test result, no whitening was marked with o, slight whitening with Δ, and obvious occurrence of whitening with X.

Organic substance elution property: The amount of organic substance eluted to the content of can was investigated. A test piece, cut into 20×7.5 cm, was immersed in pure water of 100 ml at 125° C. for 30 minutes to elute organic substances to determine the chemical oxygen demand (COD). If the value of COD is less than 10 ppm, the laminate state of resin film is acceptable.

The plated steel sheets were produced by performing chromium plating in the first and second embodiments or by performing tinning and chromate treatment following chromium plating in the third and fourth embodiments. These plated steel sheets were coated with a resin film using an adhesive in the first and third embodiments or by roll compression in the second and fourth embodiments except for the non-resin-coated areas to obtain laminated steel sheets. The detailed conditions of test piece used for the investigation and the test results are given in Tables 1 through 4. These data are shown for the first to fourth embodiments.

TABLE 1

| 1st Embodiment | Test No. | Coating weight of plating Metallic chromium (mg/m$^2$) | Coating weight of plating Hydrated chromium oxide (mg/m$^2$) | Resin film | Epoxy resin in adhesive Number average molecular weight | Epoxy resin in adhesive Content (%) | Organic substance elution property (ppm) | Shrinkage percentage (%) | Adhesion in working | Adhesion after retorting | Resistance to whitening | Non-grinding weldability |
|---|---|---|---|---|---|---|---|---|---|---|---|---|
| Example of present invention | 1 | 48 | 3 | PET | 20000 | 90 | 3.5 | <0.1 | o | o | o | o |
| | 2 | 130 | 12 | PET | 21000 | 70 | 4.1 | <0.1 | o | o | o | o |
| | 3 | 38 | 6 | PET | 15000 | 85 | 3.8 | <0.1 | o | o | o | o |
| | 4 | 108 | 13 | PET | 25000 | 80 | 4.2 | <0.1 | o | o | o | o |
| | 5 | 8 | 5 | PET | 22000 | 75 | 3.6 | <0.1 | o | o | o | o |
| | 6 | 45 | 15 | PET | 18000 | 80 | 3.8 | <0.1 | o | o | o | o |
| | 7 | 200 | 12 | PET | 18000 | 85 | 18.8 | <0.1 | o | o | o | Δ |
| | 8 | 35 | 1 | PET | 15000 | 70 | 19.7 | <0.1 | Δ | x | o | o |
| | 9 | 5 | 30 | PET | 28000 | 90 | 3.3 | <0.1 | o | o | o | x |
| | 10 | 2 | 9 | PET | 19000 | 85 | 2.9 | <0.1 | Δ | Δ | o | o |
| Comparative example | 11 | 120 | 12 | PET | 7000 | 80 | 22.5 | <0.1 | Δ | Δ | x | o |
| | 12 | 80 | 10 | PET | 45000 | 75 | 16.8 | <0.1 | x | x | o | o |
| | 13 | 130 | 25 | PET | 20000 | 50 | 18.4 | <0.1 | x | x | Δ | o |
| | 14 | 35 | 5 | PET | 25000 | 95 | 24.5 | <0.1 | o | Δ | x | o |
| | 15 | 75 | 8 | NY | 20000 | 75 | 28.5 | 4.8 | Δ | Δ | Δ | o |
| | 16 | 40 | 10 | PP | 18000 | 80 | 27.5 | 4.5 | Δ | x | Δ | o |

In this embodiment of the present invention, test results are satisfactory for all items.

Contrarily, in the comparative examples, too high coating weight of metallic chromium or hydrated chromium oxide impairs the weldability, while too low coating weight impairs the adhesion. When the molecular weight of epoxy resin in adhesive is too low, or the content is improper, uncured adhesive remains, which poses problems in retorting. When the resin type differs, shrinkage occurs, and the adhesion property is lowered, which naturally poses problems in retorting.

TABLE 2

| 2nd Embodiment | Test No. | Coating weight of plating Metallic chromium (mg/m$^2$) | Coating weight of plating Hydrated chromium oxide (mg/m$^2$) | Resin film | Replacement ratio of isophthalic acid (mol %) | Plating surface roughness PPI (threshold: 0.5 μm) | Shrinkage percentage (%) | Adhesion in working | Adhesion after retorting | Non-grinding weldability |
|---|---|---|---|---|---|---|---|---|---|---|
| Example of present invention | 17 | 50 | 5 | 1-PET | 1.0 | 5 | <0.1 | o | o | o |
| | 18 | 130 | 12 | 1-PET | 5.5 | 30 | <0.1 | o | o | o |
| | 19 | 45 | 8 | 1-PET | 10.0 | 80 | <0.1 | o | o | o |
| | 20 | 125 | 15 | 1-PET | 0.5 | 20 | <0.1 | o | o | o |
| | 21 | 10 | 4 | 1-PET | 4.0 | 110 | <0.1 | o | o | o |
| | 22 | 48 | 12 | 1-PET | 8.5 | 150 | <0.1 | o | o | o |
| | 23 | 55 | 3 | Two layers | *1.5 | 90 | <0.1 | o | o | o |
| | 24 | 135 | 12 | Two layers | *9.5 | 130 | <0.1 | o | o | o |
| Comparative example | 25 | 100 | 10 | 1-PET | 2.5 | 200 | <0.1 | Δ | Δ | o |
| | 26 | 50 | 1 | 1-PET | 5.0 | 115 | <0.1 | Δ | Δ | o |
| | 27 | 15 | 25 | 1-PET | 7.5 | 55 | <0.1 | o | o | x |
| | 28 | 3 | 5 | 1-PET | 6.0 | 10 | <0.1 | Δ | Δ | o |
| | 29 | 70 | 11 | 1-PET | 0.2 | 25 | <0.1 | Δ | Δ | o |
| | 30 | 125 | 8 | 1-PET | 15.0 | 120 | 2.1 | o | x | o |

Notes: 1-PET means polyethylene terephthalate partially replaced by isophthalic acid.
*Symbol means replacement ratio of isophthalic acid contained in the lower layer.

In this embodiment of the present invention, test results are satisfactory for all items.

Contrarily, in the comparative examples, too rough plated surface or too low coating weight of metallic chromium or hydrated chromium oxide impairs the adhesion property, which poses problems in retorting. Too high coating weight of hydrated chromium oxide deteriorates the weldability. Improper replacement ratio of isophthalic acid poses problems in retorting.

ment, which poses problems in retorting. When the resin type differs, shrinkage occurs, and the adhesion property is lowered, as with the first embodiment, which naturally poses problems in retorting.

Although adhesive is applied to the resin film in this

TABLE 3

| 3rd Embodiment | Test No. | Coating weight of plating | | | Resin film | Epoxy resin in adhesive | | Organic substance elution property (ppm) | Shrinkage percentage (%) | Adhesion in working | Adhesion after retorting | Resistance to whitening | Non-grinding weldability |
|---|---|---|---|---|---|---|---|---|---|---|---|---|---|
| | | Metallic chromium (mg/m²) | Tin (mg/m²) | Chromate (mg/m²) | | Number average molecular weight | Content (%) | | | | | | |
| Example of present invention | 31 | 75 | 350 | 23 | PET | 20000 | 75 | 1.9 | <0.1 | o | o | o | |
| | 32 | 40 | 80 | 30 | PET | 18000 | 80 | 2.5 | <0.1 | o | o | o | |
| | 33 | 150 | 50 | 12 | PET | 25000 | 90 | 2.3 | <0.1 | o | o | o | |
| | 34 | 5 | 170 | 7 | PET | 15000 | 70 | 2.8 | <0.1 | o | o | o | |
| | 35 | 25 | 500 | 15 | PET | 28000 | 85 | 2.2 | <0.1 | o | o | o | |
| | 36 | 100 | 240 | 3 | PET | 30000 | 75 | 1.8 | <0.1 | o | o | o | |
| Comparative example | 37 | 15 | 230 | 40 | PET | 28000 | 90 | 3.3 | <0.1 | o | o | o | x |
| | 38 | 130 | 470 | 2 | PET | 23000 | 80 | 3.1 | <0.1 | x | x | o | |
| | 39 | 75 | 300 | 10 | PET | 8000 | 75 | 22.4 | <0.1 | Δ | Δ | x | |
| | 40 | 125 | 150 | 12 | PET | 43000 | 80 | 18.6 | <0.1 | Δ | x | o | |
| | 41 | 65 | 55 | 8 | PET | 22000 | 50 | 19.2 | <0.1 | x | x | Δ | |
| | 42 | 100 | 250 | 12 | PET | 20000 | 95 | 23.1 | <0.1 | Δ | x | x | |
| | 43 | 50 | 450 | 8 | NY | 22000 | 80 | 25.5 | 5.6 | Δ | x | Δ | o |
| | 44 | 80 | 50 | 10 | PP | 20000 | 75 | 24.8 | 5.4 | Δ | x | Δ | o |

Notes:
PET means polyethylene terephthalate
NY means nylon
PP means polypropylene In this embodiment of the present invention, test results are satisfactory for all items. In particular, the weldability is excellent.

Contrarily, in the comparative examples, too high coating weight of chromate impairs the weldability, while too low coating weight impairs the adhesion. Improper molecular weight or content of epoxy resin in adhesive impairs the adhesion as with the first embodiment, which poses problems in retorting. When the resin type differs, shrinkage occurs, and the adhesion property is lowered, as with the first embodiment, which naturally poses problems in retorting.

embodiment, adhesive may be applied onto the plated steel sheet in a strip form to stick the resin film to it. In the case of thermo-compression, corona discharge may be performed on the resin film to improve adhesion.

As described above, the laminated steel sheet in accordance with the present invention is so constructed that a film having high corrosion resistance and workability and very low shrinkage percentage is tightly bonded to the surface of plated steel sheet having high weldability and corrosion resistance, the non-resin coated area being left. Therefore, the adhesion strength between the resin film and the plated layer is not de-

TABLE 4

| 4th Embodiment | Test No. | Coating weight of plating | | | Resin film | Plating surface roughness PPI (threshold: 0.5 μm) | Replacement ratio of isophthalic acid (mol %) | Shrinkage percentage (%) | Adhesion in working | Adhesion after retorting | Non-grinding weldability |
|---|---|---|---|---|---|---|---|---|---|---|---|
| | | Metallic chromium (mg/m²) | Tin (mg/m²) | Chromate (mg/m²) | | | | | | | |
| Example of present invention | 45 | 100 | 50 | 12 | 1-PET | 80 | 1.2 | <0.1 | o | o | |
| | 46 | 80 | 480 | 10 | 1-PET | 30 | 5.2 | <0.1 | o | o | |
| | 47 | 50 | 65 | 3 | 1-PET | 5 | 9.5 | <0.1 | o | o | |
| | 48 | 150 | 320 | 8 | 1-PET | 150 | 0.5 | <0.1 | o | o | |
| | 49 | 95 | 210 | 15 | 1-PET | 110 | 6.4 | <0.1 | o | o | |
| | 50 | 130 | 55 | 5 | 1-PET | 20 | 8.2 | <0.1 | o | o | |
| | 51 | 120 | 320 | 13 | Two layers | 130 | *2.5 | <0.1 | o | o | |
| | 52 | 70 | 170 | 7 | Two layers | 70 | *7.7 | <0.1 | o | o | |
| Comparative example | 53 | 90 | 50 | 13 | 1-PET | 190 | 2.5 | <0.1 | Δ | Δ | |
| | 54 | 55 | 180 | 2 | 1-PET | 65 | 7.5 | <0.1 | x | x | |
| | 55 | 2 | 330 | 4 | 1-PET | 90 | 6.0 | <0.1 | Δ | Δ | |
| | 56 | 60 | 220 | 45 | 1-PET | 90 | 0.3 | <0.1 | Δ | Δ | x |
| | 57 | 110 | 90 | 27 | 1-PET | 120 | 14.2 | 2.0 | o | Δ | |

Notes:
1-PET means polyethylene terephthlate partially replaced by isophthalic acid.
*Symbol means replacement ratio of isophthalic acid contained in the lower layer.

In this embodiment of the present invention, test results are satisfactory for all items. In particular, the weldability is excellent as with the third embodiment.

Contrarily, in the comparative examples, too high coating weight of chromate impairs the weldability, while too low coating weight impairs the adhesion. Improper molecular weight or content of epoxy resin in adhesive impairs the adhesion as with the first embodicreased in the can making and filling processes. Even when an adhesive is used, the uncured resin does not remain and whitening does not occur in retorting because this bonding layer has a high short curing time property. Thus, the effect of the present invention is very large because the present invention provides a high-property material for cans which exhibits the characteristics of the material and saves labor.

What is claimed is:

1. A laminated elongated steel sheet for producing cans by welding comprising:
   (a) a steel sheet;
   (b) a metallic chromium plated layer formed on said steel sheet, said metallic chromium plated layer having a coating weight of 5 to 150 mg/m$^2$;
   (c) a hydrated chromium oxide layer formed on said metallic chromium plated layer, said hydrated chromium oxide layer having a coating weight of 3 to 15 mg/m$^2$ based on chromium;
   (d) a bonding layer formed on portions of said hydrated chromium oxide coated metallic chromium plated layer (c), said bonding layer being obtained by curing an adhesive comprising bisphenol A epoxy resin which has a number average molecular weight of 15,000 to 30,000, the bisphenol A epoxy resin being in an amount of 70 wt % to 90 wt % of said bonding layer, with the remainder of said bonding layer being a resol phenol resin which has a base of bisphenol A; and
   (e) a biaxially oriented polyethylene terephthalate resin film bonded on said bonding layer,
   said bonding layer being formed to define a plurality of spaced apart non-resin coated regions forming stripe-shaped longitudinal non-resin coated bands disposed in a lateral direction of the steel sheet, adjacent non-resin coated bands being separated by said bonding layer, said non-resin coated bands providing a region for welding.

2. The laminated steel sheet for producing cans of claim 1 wherein
   said metallic chromium plated layer has a coating weight of to 135 mg/m$^2$.
   said hydrated chromium oxide layer has a coating weight based on chromium of 5 to 13 mg/m$^2$; and
   said bisphenol A epoxy resin has a number average molecular weight of 15,000 to 28,000 and is in an amount of to 85% of said bonding layer.

3. The laminated steel sheet for producing cans of claim 1 wherein
   said metallic chromium plated layer has a coating weight of to 135 mg/m$^2$;
   said hydrated chromium oxide layer has a coating weight based on chromium of 7 to 12 mg/m$^2$; and
   said bisphenol A epoxy resin has a number average molecular weight of 16,000 to 25,000 and is in an amount of 75% to 85% of said bonding layer.

4. The laminated steel sheet for producing cans of claim 1 wherein the non-resin coated region has a width of 5 mm or more.

5. A laminated elongated steel sheet for producing cans by welding comprising:
   (a) a steel sheet;
   (b) a metallic chromium plated layer formed on said steel sheet, said metallic chromium plated layer having a coating weight of 50 to 150 mg$^2$;
   (c) a tin layer formed on said metallic chromium plated layer, said tin layer having a coating weight of 50 to 500 mg/m$^2$;
   (d) a chromate layer formed on said tin layer, said chromate layer having a coating weight of 3 to 30 mg/m$^2$ based on chromium;
   (e) a bonding layer formed on portions of said chromate layer, said bonding layer being obtained by curing an adhesive comprising bisphenol A epoxy resin which has a number average molecular weight of 15,000 to 30,000, the bisphenol A epoxy resin being in an amount of 70 wt % to 90 wt % of said bonding layer, with the remainder of said bonding layer being a resol phenol resin which has a base of bisphenol A; and
   (f) a biaxially oriented polyethylene terephthalate resin film bonded on said bonding layer,
   said bonding layer being formed to define a plurality of spaced apart non-resin coated regions forming stripe-shaped longitudinal non-resin coated bands disposed in a lateral direction of the steel sheet, adjacent non-resin coated bands being separated by said bonding layer, said non-resin coated bands providing a region for welding.

6. The laminated steel sheet for producing cans of claim 5 wherein
   said metallic chromium plated layer has a coating weight of 60 to 140 mg/m$^2$;
   said chromate layer has a coating weight of 7 to 26 mg/m$^2$ based on chromium;
   said bisphenol A epoxy resin has a number average molecular weight of 15,000 to 28,000 and is in an amount of 75% to 85% of said bonding layer; and
   said polyethylene terephthalate resin film has a thickness of 5 to 60 μm.

7. The laminated steel sheet for producing cans of claim 5 wherein
   said metallic chromium plated layer has a coating weight of 70 to 135 mg/m$^2$;
   said chromate layer has a coating weight of 12 to 23 mg/m$^2$ based on chromium;
   said bisphenol A epoxy resin has a number average molecular weight of 16,000 to 25,000 and is in an amount of 75% to 85% of said bonding layer; and
   said polyethylene terephthalate resin film has a thickness of 5 to 60 μm.

8. The laminated steel sheet producing cans of claim 5 wherein the non-resin coated region has a width of 5 mm or more.

9. A laminated elongated steel sheet for producing cans by welding comprising:
   (a) a steel sheet;
   (b) a metallic chromium plated layer formed on said steel sheet, said metallic chromium plated layer having a coating weight of 5 to 150 mg/m$^2$;
   (c) a hydrated chromium oxide layer formed on said metallic chromium plated layer, said hydrated chromium oxide layer having a coating weight of 3 to 15 mg/m$^2$ based on chromium and having a surface roughness represented by a PPI of 5 to 150; and
   (d) a biaxially oriented film thermo-compressed on portions of said hydrated chromium oxide layer, said biaxially oriented film being formed to define a plurality of spaced apart uncoated regions forming stripe-shaped longitudinal uncoated bands disposed in a lateral direction of the steel sheet, adjacent uncoated bands being separated by said film, said uncoated bands providing a region for welding,
   said biaxially oriented film comprising polyethylene terephthalate and an acid component, said acid component comprising terephthalic acid and 0.5 to 10 mol % of isophthalic acid.

10. The laminated steel sheet for producing cans of claim 9 wherein
    said metallic chromium plated layer has a coating weight of 10 to 135 mg/m$^2$;

said hydrated chromium oxide layer has a coating weight based on chromium of 5 to 13 mg/m$^2$; and said polyethylene terephthalate resin film contains said isophthalate acid in an amount of 2 to 8 mol % of said acid component and said biaxially oriented film has a thickness of 5 to 60 μm.

11. The laminated steel sheet for producing cans of claims 9 wherein said metallic chromium plated layer has a coating weight of 25 to 135 mg/m$^2$;

said hydrated chromium oxide layer has a coating weight based on chromium of 7 to 12 mg/m$^2$; and said polyethylene terephthalate resin film contains said isophthalate acid in an amount of 4 to 6 mol % of said acid component and said biaxially oriented film has a thickness of 5 to 60 μm.

12. The laminated steel sheet for producing cans of claim 9 wherein the uncoated region has a width of 5 mm or more.

13. A laminated elongated steel sheet for producing cans by welding comprising:

(a) a steel sheet;

(b) a metallic chromium plated layer formed on said steel sheet, said metallic chromium plated layer having a coating weight of 50 to 150 mg/m$^2$;

(c) a tin layer formed on said metallic chromium plated layer, said tin layer having a coating weight of 50 to 500 mg/m$^2$;

(d) a chromate layer formed on said tin layer, said chromate layer having a coating weight of 3 to 30 mg/m$^2$ based on chromium, and having a surface roughness represented by a PPI of 5 to 150; and (e) a biaxially oriented film thermo-compressed on portions of said chromate layer, said biaxially oriented film being formed to define a plurality of spaced apart uncoated regions forming stripe-shaped longitudinal uncoated bands disposed in a lateral direction of the steel sheet, adjacent uncoated bands being separated by said film, said uncoated bands providing a region for welding, said biaxially oriented film comprising polyethylene terephthalate and an acid component, said acid component comprising terephthalic acid and 0.5 to 10 mol % of isophthalic acid.

14. The laminated steel sheet for producing cans of claim 13 wherein said metallic chromium plated layer has a coating weight of 60 to 140 mg/m$^2$;

said chromate layer has a coating weight of 7 to 26 mg/m$^2$ based on chromium; and said polyethylene terephthalate resin film contains said isophthalate acid in an amount of 2 to 8 mol % of said acid component and said biaxially oriented film has a thickness of 5 to 60 μm.

15. The laminated steel sheet for producing cans of claim 13 wherein said metallic chromium plated layer has a coating weight of 70 to 135 mg/m$^2$;

said chromate layer has a coating weight of 12 to 23 mg/m$^2$ based on chromium; and said polyethylene terephthalate resin film contains said isophthalate acid in an amount of 4 to 6 mol % of said acid component and said biaxially oriented film has a thickness of 5 to 60 μm.

16. The laminated steel sheet producing cans of claim 13 wherein the uncoated region has a width of 5 mm or more.

17. A laminated elongated steel sheet for producing cans by welding comprising:

(a) a steel sheet;

(b) a metallic chromium plated layer formed on said steel sheet, said metallic chromium plated layer having a coating weight of 5 to 150 mg/m$^2$;

(c) a hydrated chromium oxide layer formed on said metallic chromium plated layer, said hydrated chromium oxide layer having a coating weight of 3 to 15 mg/m$^2$ based on chromium, and having a surface roughness represented by a PPI of 5 to 150; and (d) a two-layer resin film having a lower layer and an upper layer and being thermo-compressed on portions of said hydrated chromium oxide layer, said resin film being formed to define a plurality of spaced apart non-resin coated regions forming stripe-shaped longitudinal non-resin coated bands disposed in a lateral direction of the steel sheet, adjacent non-resin coated bands being separated by said film, said non-resin coated bands providing a region for welding, (e) said lower layer of said two-layer resin film comprising polyethylene terephthalate and an acid component, said acid component comprising terephthalic acid and 0.5 to 10 mol % of isophthalic acid, and said upper layer of said two-layer resin film comprising a biaxially oriented polyethylene terephthalate resin.

18. The laminated steel sheet for producing cans of claim 17 wherein said metallic chromium plated layer has a coating weight of 10 to 135 mg/m$^2$;

said hydrated chromium oxide layer has a coating weight based on chromium of 5 to 13 mg/m$^2$; and said two-layer resin film has a thickness of 5 to 60 μm, said lower layer has a thickness of at least 1 μm, and said lower layer being polyethylene terephthalate resin film which contains said isophthalate acid in an amount of 2 to 8 mol % of said acid component.

19. The laminated steel sheet for producing cans of claim 17 wherein said metallic chromium plated layer has a coating weight of 25 to 135 mg/m$^2$;

said hydrated chromium oxide layer has a coating weight based on chromium of 7 to 12 mg/m$^2$; and said two-layer resin film has a thickness of 5 to 60 μm, said lower layer has a thickness of at least 1 μm, and said lower layer being polyethylene terephthalate resin film which contains said isophthalate acid in an amount of 4 to 6 mol % of said acid component.

20. The laminated steel sheet for producing cans of claim 17 wherein the non-resin coated region has a width of 5 mm or more.

21. A laminated elongated steel sheet for producing cans by welding comprising:

(a) a steel sheet;

(b) a metallic chromium plated layer formed on said steel sheet, said metallic chromium plated layer having a coating weight of 50 to 150 mg/m$^2$;

(c) a tin layer formed on said metallic chromium plated layer, said tin layer having a coating weight of 50 to 500 mg/m$^2$;

(d) a chromate layer formed on said tin layer, said chromate layer having a coating weight of 3 to 30 mg/m² based on chromium, and having a surface roughness represented by a PPI of 5 to 150; and (e) a two-layer resin film having a lower layer and an upper layer and being thermo-compressed on portions of said chromate layer, said resin film being formed to define a plurality of spaced apart non-resin coated regions forming stripe-shaped longitudinal non-resin coated bands disposed in a lateral direction of the steel sheet, adjacent non-resin coated bands being separated by said film, said non-resin coated bands providing a region for welding, said lower layer of said two-layer resin film comprising polyethylene terephthalate and an acid component, said acid component comprising terephthalic acid and 0.5 to 10 mol % of isophthalic acid, and said upper layer of said two-layer resin film comprising a biaxially oriented polyethylene terephthalate resin.

22. The laminated steel sheet for producing cans of claim 21 wherein said metallic chromium plated layer has a coating weight of 60 to 140 mg/m²;

said chromate layer has a coating weight of 7 to 26 mg/m² based on chromium; and said two-layer resin film has a thickness of 5 to 60 μm, said lower layer has a thickness of at least 1 μm, and said lower layer being polyethylene terephthalate resin film which contains said isophthalate acid in an amount of 2 to 8 mol % of said acid component.

23. The laminated steel sheet for producing cans of claim 21 wherein said metallic chromium plated layer has a coating weight of 70 to 135 mg/m²;

said chromate layer has a coating weight of 12 to 23 mg/m² based on chromium; and said two-layer resin film has a thickness of from 5 to 60 μm, said lower layer has a thickness of at least 1 μm, and said lower layer being polyethylene terephthalate resin film which contains said isophthalate acid in an amount of 4 to 6 mol % of said acid component.

24. The laminated steel sheet producing cans of claim 21 wherein the non-resin coated region has a width of 5 mm or more.

* * * * *

UNITED STATES PATENT AND TRADEMARK OFFICE
CERTIFICATE OF CORRECTION

PATENT NO. : 5,436,058
DATED : July 25, 1995
INVENTOR(S) : KATO et al

It is certified that error appears in the above-identified patent and that said Letters Patent is hereby corrected as shown below:

```
Column 5,  line 64:  "resin" (first occurrence)
          should be --resins--.

Column 6,  line 42:  after "of" insert --the--.

Column 10, line 3:   after "steel", replace "sheet"
          with --sheets--.

Column 10, line 61:  after "30%" insert --was marked--.

Column 15, line 36 (Claim 2):  after "of"
          insert --10--.

Column 15, line 41 (Claim 2):  after "of" (1st Occur.)
          insert --75%--.

Column 15, line 45 (Claim 3):  after "of"
          insert --25--.
```

Signed and Sealed this

Thirtieth Day of December, 1997

Attest:

BRUCE LEHMAN

*Attesting Officer*     *Commissioner of Patents and Trademarks*